United States Patent
Lucka et al.

(10) Patent No.: US 9,784,156 B2
(45) Date of Patent: *Oct. 10, 2017

(54) PARTICLE FILTER ASSEMBLY AND METHOD FOR CLEANING A PARTICLE FILTER

(75) Inventors: Klaus Lucka, Aachen (DE); Stephan Kohne, Wurselen (DE)

(73) Assignee: Alfa Laval Aalborg A/S, Aalborg (DK)

( * ) Notice: Subject to any disclaimer, the term of this patent is extended or adjusted under 35 U.S.C. 154(b) by 1650 days.

This patent is subject to a terminal disclaimer.

(21) Appl. No.: 12/675,399

(22) PCT Filed: Sep. 1, 2008

(86) PCT No.: PCT/NO2008/000309
§ 371 (c)(1),
(2), (4) Date: Sep. 22, 2010

(87) PCT Pub. No.: WO2009/028957
PCT Pub. Date: Mar. 5, 2009

(65) Prior Publication Data
US 2011/0023453 A1    Feb. 3, 2011

Related U.S. Application Data

(60) Provisional application No. 60/968,899, filed on Aug. 30, 2007.

(51) Int. Cl.
*F01N 3/025* (2006.01)
*F01N 3/08* (2006.01)
(Continued)

(52) U.S. Cl.
CPC ........... *F01N 3/0821* (2013.01); *F01N 3/023* (2013.01); *F01N 3/025* (2013.01); *F01N 3/0253* (2013.01);
(Continued)

(58) Field of Classification Search
USPC .......... 60/277, 285, 295, 297, 286, 303, 324
See application file for complete search history.

(56) References Cited

U.S. PATENT DOCUMENTS 5,592,925 A    1/1997  Machida et al.
5,785,937 A *  7/1998  Neufert et al. ............ 423/213.2
(Continued)

FOREIGN PATENT DOCUMENTS

JP         10306718       11/1998
WO    WO 2006032644 A1 *  3/2006  ............... B01J 8/02
WO        2007/037652     4/2007

OTHER PUBLICATIONS

Office Action of Oct. 10, 2012 from JP patent office, submitted, inter alia, as statement of relevance of non-English refs.

*Primary Examiner* — Patrick Maines
(74) *Attorney, Agent, or Firm* — Christian D. Abel

(57) ABSTRACT

Engine exhaust system for an internal combustion engine, the engine exhaust system comprising an exhaust conduit (14) connected to an engine (30), an exhaust gas return conduit (32,33) such that at least a part of the exhaust gas can be returned to the engine. The exhaust gas return conduit, at least along a part of its length, is formed with at least two flow paths (48,49). The engine exhaust system further comprises a particle filter arranged in each of the at least two flow paths and at least one cold flame vaporizer (11) in which fuel is partially oxidized in preheated air to form a cold flame gas. The at least one cold flame vaporizer is arranged in fluid communication with all the flow paths such that the cold flame gas can flow through the particle filters, whereby the cold flame gas can be used to regenerate the particle filter in at least one of the exhaust flow paths while, simultaneously, exhaust gas can flow through the other exhaust flow path or exhaust flow paths. A method for the cleaning of a particle filter is also provided.

36 Claims, 3 Drawing Sheets

(51) Int. Cl.
  *F01N 3/023* (2006.01)
  *F01N 3/30* (2006.01)
  *F01N 3/36* (2006.01)

(52) U.S. Cl.
  CPC ........... *F01N 3/0842* (2013.01); *F01N 3/306* (2013.01); *F01N 3/36* (2013.01); *F01N 2240/30* (2013.01); *F01N 2250/02* (2013.01); *F01N 2250/04* (2013.01); *F01N 2270/04* (2013.01); *F01N 2610/00* (2013.01); *Y02T 10/24* (2013.01)

(56) References Cited

U.S. PATENT DOCUMENTS

| | | | |
|---|---|---|---|
| 6,793,693 B1* | 9/2004 | Koehne et al. | 44/300 |
| 6,955,042 B1* | 10/2005 | Wnuck et al. | 60/286 |
| 2003/0226350 A1 | 12/2003 | Liu | |
| 2004/0001983 A1* | 1/2004 | Matos da Silva et al. | 429/17 |
| 2004/0098977 A1* | 5/2004 | Kupe et al. | 60/286 |
| 2004/0163377 A1* | 8/2004 | Liu | 60/275 |
| 2005/0053534 A1* | 3/2005 | Liu et al. | 423/212 |
| 2005/0274107 A1* | 12/2005 | Liu et al. | 60/286 |
| 2006/0059896 A1* | 3/2006 | Liu et al. | 60/286 |
| 2006/0096282 A1 | 5/2006 | Freidrich | |
| 2006/0213187 A1* | 9/2006 | Kupe et al. | 60/286 |
| 2007/0261686 A1* | 11/2007 | Montel | 123/585 |
| 2008/0307707 A1* | 12/2008 | Nougier et al. | 48/199 FM |
| 2009/0308057 A1* | 12/2009 | Fresnet et al. | 60/287 |
| 2010/0236223 A1* | 9/2010 | Ovrebo et al. | 60/287 |
| 2010/0242898 A1* | 9/2010 | Ovrebo et al. | 123/299 |
| 2011/0023453 A1* | 2/2011 | Lucka et al. | 60/273 |
| 2012/0051990 A1* | 3/2012 | Ovrebo et al. | 423/210 |

\* cited by examiner

PARTICLE FILTER ASSEMBLY AND METHOD FOR CLEANING A PARTICLE FILTER

The present invention relates to a particle filter apparatus and an engine exhaust system wherein a particle filter is regenerated by using a cold flame gas. The invention also relates to a method for cleaning a particle filter and a method for cleaning a particle filter arranged in an exhaust gas return system. The invention also relates to the use of the particle filter apparatus, the engine exhaust system and the methods for cleaning a particle filter where the exhaust gas originates from a compression ignition engine.

The cold flame is a phenomenon which has so far not received too much attention. In a cold flame the fuel is partially oxidized in preheated air and the temperature is kept constant at about 450° C., and it is independent of air/fuel ratio and residence time. In the cold flame process, only 2-20% (typically 6-9%) of the calorific value of the fuel is released, and this heat is used to evaporate the fuel, giving a homogenous gaseous fuel. During developmental work, it has been observed that the gas was able to remove carbon deposits from the reactor walls. The reason for this has not been established yet, but is thought to be due to free radicals that are present in the cold flame gas, i.e. the partially oxidized, gaseous fuel.

A more complete description of the cold flame gas phenomenon can be found in U.S. Pat. No. 6,793,693.

Exhaust from compression ignition engines (often imprecisely called diesel engines), which operate on excess air, contains mainly particulates, NOx and incomplete combustion products (HC and CO). Particulates can be removed using a filter downstream from the engine. After a while, the filter will be blocked and need to be regenerated. This is done by increasing the temperature in the exhaust gas to above 800° C. under oxidizing conditions and thereby burn away the carbon deposits. In order to allow for continuous operation, it is common to have two filters in parallel and a valve which sends the majority of the exhaust to one of the filters while the other is being regenerated.

Incomplete combustion products (HC and CO) can be removed by an oxidation catalyst.

NOx, on the other hand, can only be removed catalytically if the exhaust gas is slightly reducing (as in an Otto engine). This is not normally the case in a compression ignition engine.

One way to reduce NOx emissions in a diesel engine is to recirculate some of the exhaust back into the engine (EGR). While this works for smaller diesel engines operating on clean diesel fuel, it is not practical for larger engines operating on heavy fuel oil since it will produce particulates in the exhaust that will mix with the lubricating oil and cause premature engine wear. Attempts to insert a filter in the EGR loop has not been successful since the exhaust also contains salts and other metal compounds which will melt during filter regeneration (when the temperature is increased to above 600° C.) and cause permanent damage to the filter.

There is therefore an objective of the present invention to improve the regeneration of a particle filter and thereby extending its use to diesel engines running on heavy diesel fuels.

This objective is achieved by the present invention as defined in the independent claims. Further embodiments of the invention are defined in the dependent claims.

There is provided a particle filter apparatus comprising a particle filter which is arranged in an exhaust gas conduit of an internal combustion engine so that the exhaust gas, containing particulate matter and soot, is cleaned when passing through the particle filter. The particle filter apparatus further comprises a cold flame vaporizer in which fuel is partially oxidized in preheated air to form a cold flame gas, the cold flame vaporizer being arranged in fluid communication with the exhaust conduit such that the cold flame gas can flow through the particle filter, thereby removing deposits of soot which has accumulated in the particle filter.

The cold flame vaporizer is a standard cold flame vaporizer in which the fuel can be partially oxidized in preheated air to provide fully varporised fuel with free radicals. In a cold flame vaporizer air and fuel is mixed in a proportion of 0.3-1.0 (1.0 is stoichiometric air/fuel ratio), but only a small fraction of the air is used in the cold flame reaction.

The exhaust gas conduit may be a pipe or similar of any cross sectional shape, or the exhaust gas conduit may be formed as internal conduits in a larger body.

The means for preheating the air may be a heat exchanger in which the heat of the exhaust gas warms up the air. It would also be possible to use other means for preheating the, for instance electrical heating means.

The particle filter apparatus is further provided with one or more valve means which controls the flow of exhaust gas through the exhaust gas conduit. When regenerating the particle filter in the exhaust gas conduit, the flow of exhaust gas can therefore at least partially be shut off.

Furthermore, the particle filter apparatus is provided with valve means which controls the flow of cold flame gas from the cold flame vaporizer into the exhaust gas conduit and through the particle filter.

These valve means may be controlled such that the particle filter is regenerated, for instance, at specific time intervals, or when the pressure drop across a particle filter reaches a predetermined level indicating that the particle filter needs to be regenerated.

The cold flame vaporizer may be arranged outside the exhaust gas conduit and, if necessary, connected to the exhaust gas conduit with fluid lines. If the cold flame vaporizer is mounted to the exhaust gas conduit, then there may only be necessary to provide openings into the exhaust gas conduit, while if the cold flame vaporizer is arranged separate from the exhaust gas conduit, fluid lines will be provided connecting the cold flame vaporizer and the exhaust gas conduit.

In an embodiment of the invention, the cold flame vaporizer can also be arranged inside the exhaust gas conduit. In that case, there is no need for fluid lines as the cold flame vaporizer may just release the cold flame gas into the exhaust gas conduit through openings including said valve means.

Furthermore, the exhaust gas apparatus comprises a fuel supply which is arranged in fluid communication with the cold flame vaporizer. The exhaust gas apparatus also comprises an air supply and means for preheating the air, the air supply being in fluid communication with the cold flame vaporizer. In order to control the flow of fuel and preheated air into the cold flame vaporizer, the exhaust gas apparatus comprises one or more valve means controlling the flow of fuel and preheated air to said cold flame vaporizer.

There is also provided an engine exhaust system for an internal combustion engine, where the engine exhaust system comprises an exhaust conduit connected to the engine and an exhaust gas return conduit such that at least a part of the exhaust gas can be returned to the engine. The exhaust gas return conduit is, at least along a part of its length, formed with at least two flow paths. The engine exhaust system further comprises a particle filter arranged in each of the at least two flow paths and at least one cold flame vaporizer in which fuel is partially oxidized in preheated air to form a cold flame gas. The at least one cold flame vaporizer is arranged in fluid communication with all the flow paths such that the cold flame gas can flow through any of the particle filters. The cold flame gas can thereby be used to regenerate the particle filter in at least one of the exhaust flow paths while, simultaneously, exhaust gas can flow through the other exhaust flow path or exhaust flow paths.

The cold flame vaporizer is, as mentioned above, a standard cold flame vaporizer in which the fuel can be partially oxidized in preheated air. In the cold flame vaporizer air and fuel is mixed in a proportion of 0.3-1.0 (1.0 is stoichiometric air/fuel ratio), but only a small fraction of the air is used in the cold flame reaction.

The exhaust gas conduit may be a pipe or similar of any cross sectional shape, or the exhaust gas conduit may be formed as internal conduits in a larger body.

The means for preheating the air may be a heat exchanger in which the heat of the exhaust gas warms up the air. It would also be possible to use other means for preheating the, for instance electrical heating means.

The flow paths may be formed by providing the exhaust gas return conduit, at least along a part of its length, with one or more partitions such that two or more separate flow paths for the exhaust gas are formed in the exhaust conduit section. These partitions may be one or more plates dividing the exhaust gas return conduit in two or more flow paths. Alternatively, the flow paths may be formed by providing the exhaust gas return conduit with at least two separate conduits through which the exhaust gas can flow.

The engine exhaust system is preferably provided with one or more valve means which controls the flow of exhaust gas through the flow paths of the exhaust gas return conduit. The valve means may close off one or more flow paths for the flow of exhaust gas. The engine exhaust system is preferably also provided with one or more valve means controlling the flow of cold flame gas from the at least one cold flame vaporizer to the exhaust gas return conduit and the particle filters in the flow paths. These valve means may be controlled such that the particle filters are regenerated, for instance, at specific time intervals, or when the pressure drop across a particle filter reaches a predetermined level indicating that the particle filter needs to be regenerated.

The cold flame vaporizer may be arranged outside the exhaust gas conduit and, if necessary, connected to the exhaust gas conduit with fluid lines. If the cold flame vaporizer is mounted to the exhaust gas conduit, then there may only be necessary to provide openings into the exhaust gas conduit, while if the cold flame vaporizer is arranged separate from the exhaust gas conduit, fluid lines will be provided connecting the cold flame vaporizer and the exhaust gas conduit.

In an embodiment of the invention, the cold flame vaporizer can also be arranged inside the exhaust gas conduit. In that case, there is no need for fluid lines as the cold flame vaporizer may just release the cold flame gas into the exhaust gas conduit through openings including said valve means.

The engine exhaust system further comprises a fuel supply which is arranged in fluid communication with the at least one cold flame vaporizer. Preferably, there is also provided valve means controlling the flow of fuel to the at least one cold flame vaporizer.

The engine exhaust system also comprises an air supply and, as mentioned above, means for preheating the air, the air supply being arranged in fluid communication with the at least one cold flame vaporizer. Preferably, there is also provided valve means controlling the flow of preheated air to the at least one cold flame vaporizer.

There is also provided a method for cleaning a particle filter with deposits of particulate matter and soot originating from an exhaust gas, the filter being arranged in an exhaust conduit, the method comprising the steps of providing a cold flame gas, and letting the cold flame gas flow through the particle filter, whereby the deposited soot is removed from the particle filter.

The cold flame gas may, as explained above, be provided by partially oxidizing fuel in preheated air in a cold flame vaporizer. Obviously, the cold flame vaporizer is arranged in fluid communication with the exhaust conduit. In the cold flame vaporizer air and fuel is mixed in a proportion of 0.3-1.0 (again 1.0 is stoichiometric air/fuel ratio), but only a small fraction of the air is used in the cold flame reaction.

Furthermore, the method comprises the step of providing one or more valve means for controlling the flow of cold flame gas from the cold flame vaporizer into the exhaust conduit.

The method also comprises the step of providing a fuel supply arranged in fluid communication with the cold flame vaporizer, and an air supply and heating means for the preheating of the air, the air supply being arranged in fluid communication with the cold flame vaporizer.

Preferably, the method also comprises the step of providing one or more valve means for controlling the flow of fuel and preheated air to the cold flame vaporizer.

Furthermore, an oxidation catalyst may be arranged in each flow path of the exhaust gas return conduit such that the particle filter, the NOx trap and the oxidation catalyst is formed in a single unit. Alternatively, the oxidation catalyst may be arranged separately further downstream where the exhaust flows in a single flow path.

There is also provided a method for cleaning a particle filter arranged in an exhaust gas return system of an internal combustion engine, the exhaust gas return system comprising an exhaust gas return conduit which, at least along a part of its length, is formed with at least two flow paths, the at least two flow paths each being provided with a particle filter for the removal of particulate matter and soot in the exhaust gas, wherein the method comprises the steps of
  providing a cold flame gas,
  letting the cold flame gas flow through the particle filter in at least one of the flow paths of the exhaust gas return conduit, thereby regenerating the particle filter by removing deposited soot.

The cold flame gas may be provided by partially oxidizing fuel in preheated air in at least one cold flame vaporizer where the cold flame vaporizer is arranged in fluid communication with all the flow paths of the exhaust gas return conduit. In the cold flame vaporizer air and fuel is mixed in a proportion of 0.3-1.0 (again 1.0 is stoichiometric air/fuel ratio), but only a small fraction of the air is used in the cold flame reaction.

The method also comprises the step of providing one or more valve means for separately controlling the flow of cold flame gas from the cold flame vaporizer into each flow path of the exhaust gas conduit.

The method also comprises the step of providing a fuel supply arranged in fluid communication with the cold flame vaporizer, and an air supply and heating means for the preheating of the air, the air supply being arranged in fluid communication with the cold flame vaporizer.

The method also comprises the step of providing one or more valve means for controlling the flow of fuel and preheated air to the cold flame vaporizer.

In order to remove particulate matter from the exhaust gas before the exhaust gas passes through the NOx trap, the method also comprises the step of arranging, in each flow path in the exhaust conduit section, the NOx trap downstream of the respective particle filter.

The method also comprises the step of arranging an oxidation catalyst in the exhaust conduit section downstream of the particle filter and the NOx trap. An oxidation catalyst may be arranged in each flow path of the exhaust gas return conduit such that the particle filter, the NOx trap and the oxidation catalyst is formed in a single unit. Alternatively, the oxidation catalyst may be arranged separately further downstream where the exhaust flows in a single flow path.

There is also provided a use of the particle filter apparatus where the exhaust gas originates from a compression ignition engine running on diesel or heavy fuel oil.

There is also provided a use of the engine exhaust system where the exhaust gas originates from a compression ignition engine running on diesel or heavy fuel oil.

There is also provided a use of the method for cleaning a particle filter where the exhaust gas originates from a compression ignition engine running on diesel or heavy fuel oil.

There is also provided a use of the method for cleaning a particle filter where the exhaust gas originates from a compression ignition engine running on diesel or heavy fuel oil.

Above, only a cold flame gas produced by a cold flame vaporizer has been mentioned. A cold flame is one example of a partially oxidized fuel gas among a number of other partially oxidized fuel gases with the same properties. The present invention should therefore not be seen as limited to only a cold flame gas, but should include other partially oxidized fuel gases with the same or similar properties as the cold flame gas.

In the following, an embodiment of the invention is disclosed in detail with reference to the enclosed figures, where FIG. 1 illustrates an embodiment of the invention where a particle filter is arranged in an exhaust conduit FIG. 2a illustrates an embodiment of the invention where the particle filter is arranged in an EGR loop.

FIG. 2b is the section A-A of the particle filter on FIG. 2a.

Figure 1:
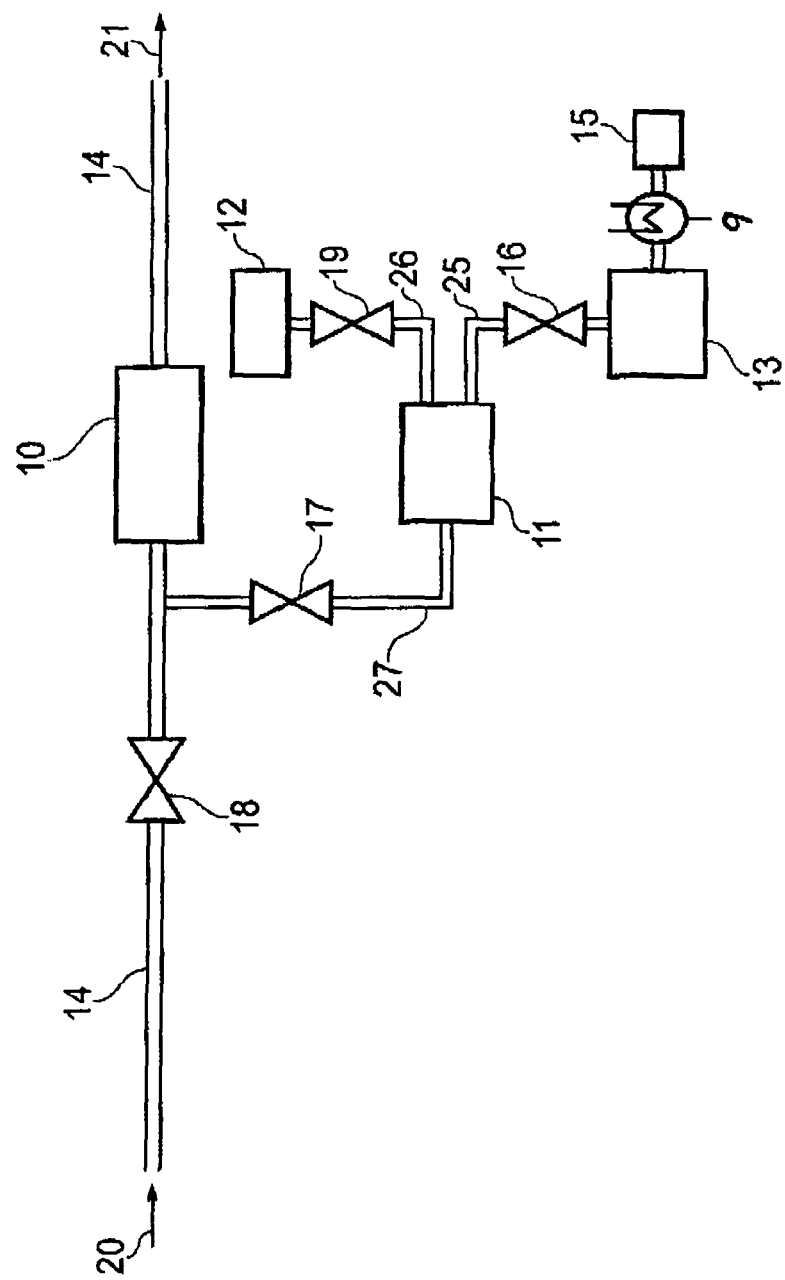

FIG. 1 schematically illustrates an embodiment of the present invention. Exhaust gas, indicated with the arrow 20 flows in an exhaust gas conduit 14. Valve means 18 are provided to control the flow of exhaust gas through the exhaust gas conduit. Further downstream there is arranged a particle filter 10 which cleans the exhaust gas for particulate matter. At certain intervals the particle filter needs to be regenerated, and that may be carried out, according to the present invention, by providing a cold flame gas and letting it flow through the particle filter until the particle filter is regenerated. In FIG. 1 the cold flame gas is produced a cold flame vaporizer 11. A fuel supply 12, for instance diesel or heavy fuel oil, is connected to the cold flame vaporizer 11 through fluid line 26. Valve means 19 is provided to control the flow of fuel to the cold flame vaporizer 11. There is also provided a fuel supply 13 which may include an air intake 15 and an air filter (not shown). The air supply 13 is connected to the cold flame vaporizer through a fluid line 25. Valve means 16 controls the flow of air from the air supply 13 to the cold flame vaporizer 11.

Preferably, there is also provided heating means (not shown) for preheating the air before being fed to the cold flame vaporizer 11. By adjust the valve means 16, 19 properly, the desired ration of fuel and air may be achieved.

The cold flame gas is fed through fluid line 27 to the exhaust gas conduit just upstream for the particle filter 10. Valve means 17 is provided to control the flow of cold flame gas from the cold flame vaporizer 11 to the exhaust gas conduit 14 and to the exhaust gas conduit 14.

When the particle filter 11 needs to be regenerated, which may be noticed by an increased pressure drop over the filter indicating that cleaning is needed, the valve means 18 is preferably closed and the valve means 17 opens for the flow of cold flame gas through the particle filter 10, and thereby regenerating it.

In FIGS. 2a-b and 3a-b, two similar embodiments of the invention is illustrated. An engine exhaust system for an internal combustion engine 30, preferably a compression ignition engine, is shown. Furthermore, there is provided an exhaust gas conduit 14 through which the exhaust, indicated by arrow 21, flows. In order to reduce the content of NOx in the exhaust from the engine 30, there is provided an EGR loop (exhaust gas return loop).

Figures 2A, 2B:
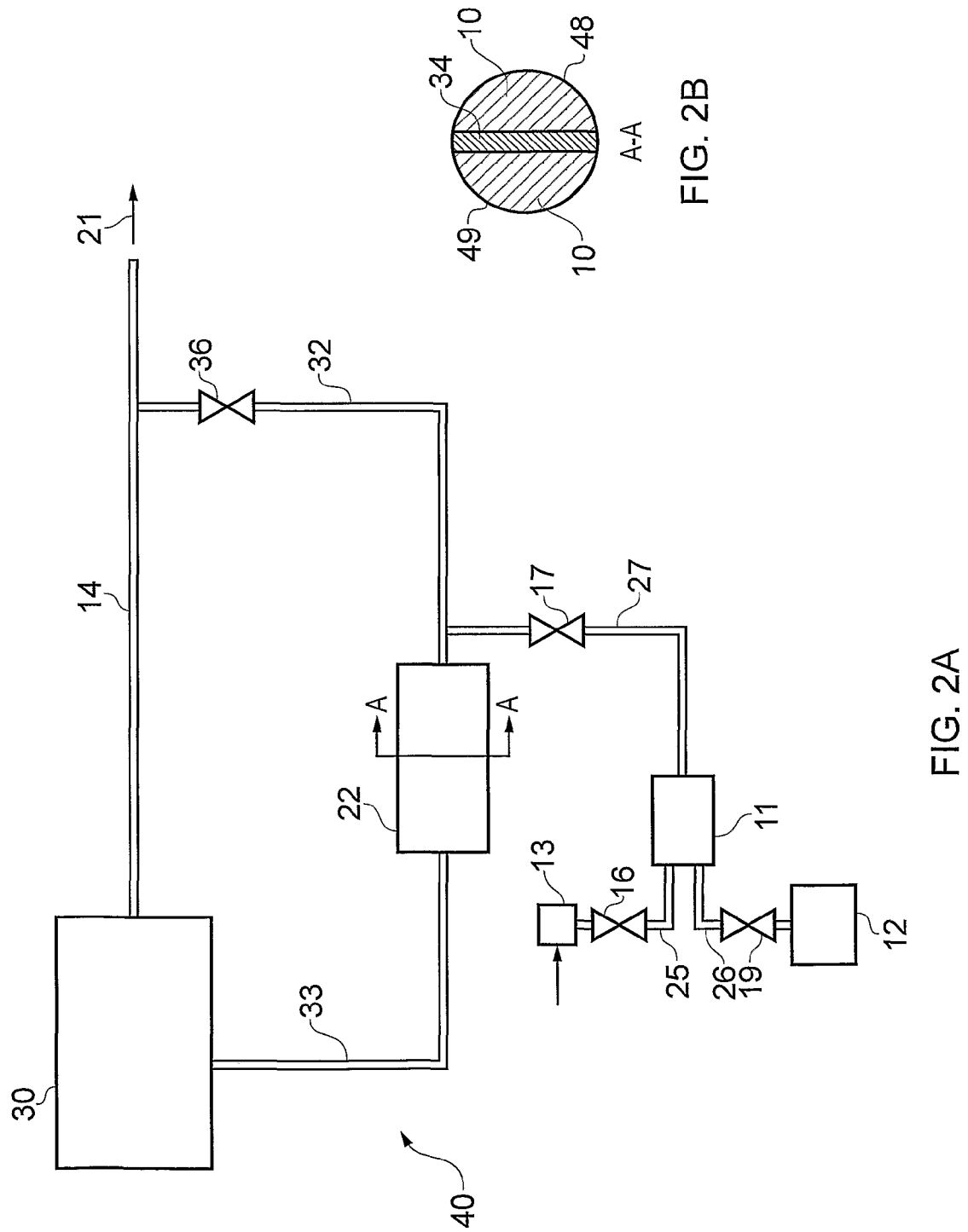

In FIG. 2a, the EGR loop is shown with a exhaust gas return conduit 32, 33. The exhaust gas return conduit comprises a fluid line 32 extending between the exhaust conduit 14 and a particle filter section 22, and a fluid line 33 extending between the particle filter section 22 and the engine 30. As can be seen on FIG. 2b the exhaust gas return conduit 32, 33 is, at least along a part of its length divided into at least two flow paths 48, 49. This length of the particle filter section will preferably correspond the length of a particle filter 10. The flow paths are formed by a partition 34 as can be seen on FIG. 2b.

A particle filter 10 is provided in each of the flow paths 48, 49 and valve means (not shown) or other means are provided to control the flow of exhaust gas through the 48, 49.

There is furthermore provided a cold flame vaporizer 11 with a fuel supply 12 and an air supply 13 in the same manner as explained above. The cold flame gas produced in the cold flame vaporizer 11 is fed to the fluid line 32 just in front of the particle filter section 10. When valve means 17 is opened, cold flame gas may flow through one or both the flow paths 48, 49.

When one of the particle filters 10 in the particle filter section 22 needs to be regenerated, valve means or other means blocks the flow path 32, 33 in which the particle filter 10 to regenerated is located, for the flow of exhaust gas. The valve means 17 opens and lets cold flame gas flow through the particle filter 10 to be regenerated. When the particle filter is regenerated the position of the valves may be switched such that the exhaust gas flows through the particle filter 10 which has just been regenerated, while the cold flame gas directed through the particle filter that needs to be regenerated. The particle filters may be considered to be regenerated, for instance when the pressure drop over the particle filter drops below a certain value.

In this way there is no need to close the EGR loop while the filters are being regenerated. In FIG. 2b there is shown that the particle filter section 22 is divided into two flow paths 48, 49 with particle filters 10, but obviously, more than two flow paths may be provided if that is deemed necessary.

Figure 3:
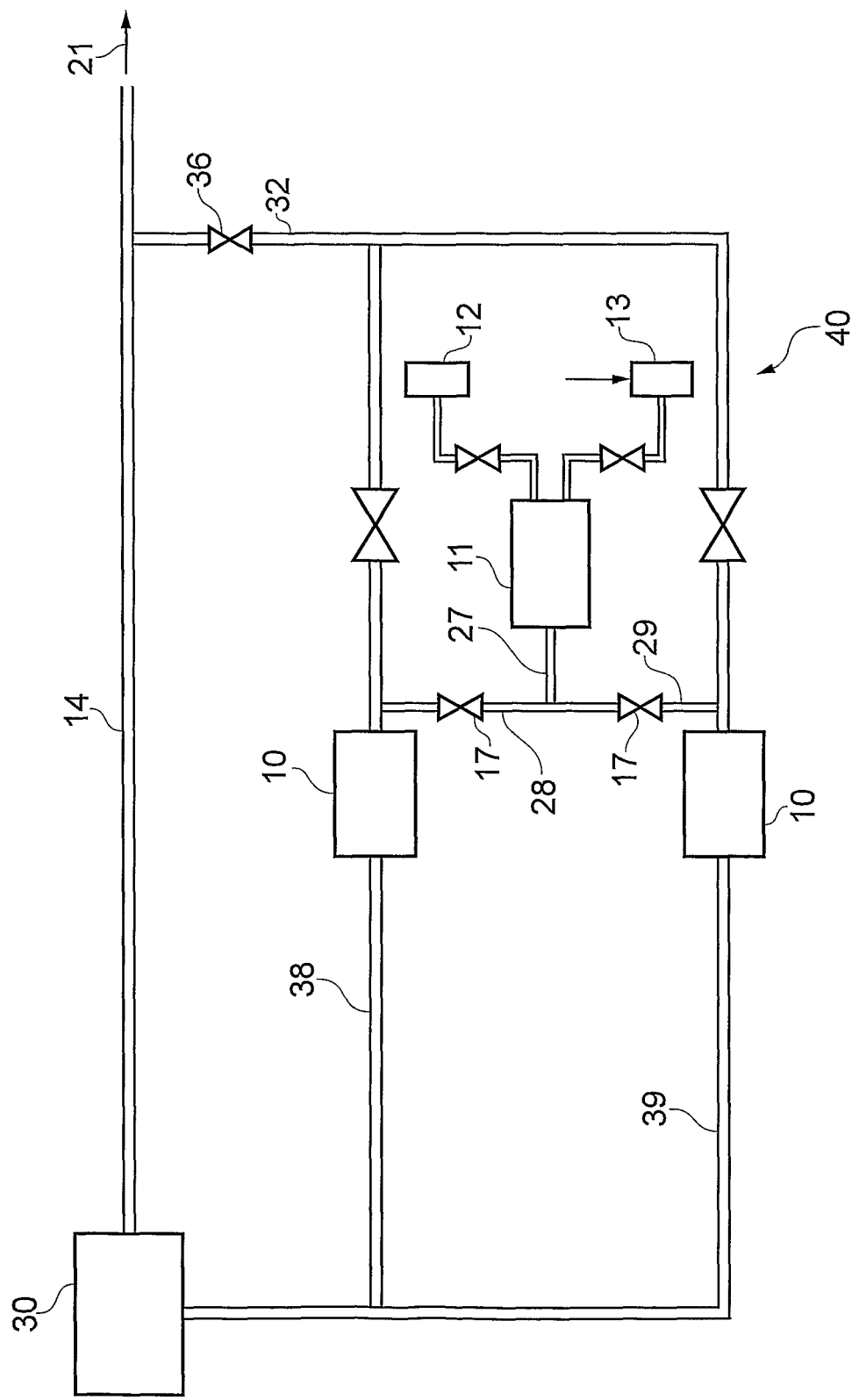
FIG. 3 illustrates another embodiment of the invention where the particle filter is arranged in an EGR loop.

The embodiment of the invention shown in FIGS. 3a and 3b is similar to the embodiment shown in FIGS. 2a and 2b.

The same numerals have been used for the same features, so only the parts that differ between the two embodiments will be explained below.

The difference between the two embodiments is that in the embodiment shown on FIGS. 3a and 3b, the flow paths are formed by two separate fluid lines instead of being partitions of a single exhaust conduit (the particle filter section in the embodiment in FIG. 2a).

In the ERG loop 40, the exhaust gas flows in two (on the drawing) parallel fluid lines 38, 39. In each of the two fluid lines 38 and 39 there is provided a particle filter 10 and valve means for controlling the flow of the exhaust gas through the two fluid lines 38, 39. The cold flame gas from the cold flame vaporizer 11 is controlled by valve means 17. When the particle filters needs to be regenerated, the valve means are adjusted such that cold flame gas flows through one particle filter 10, thereby regenerating it, while exhaust gas is guided through the other particle filter 10. After the first particle filter has been regenerated, the positions of the valve means are switched such that the exhaust gas flows through the particle filter which has just been regenerated while the cold flame gas flows through the particle filter that still needs to be regenerated.

As for the embodiment shown in FIGS. 2a and 2b, there is possible to provide more than two flow paths 38, 39 if that is needed.

The invention claimed is:

1. Particle filter apparatus comprising a particle filter which is arranged in an exhaust gas conduit of an internal combustion engine, wherein the exhaust gas, containing particulate matter and soot, is cleaned when passing through the particle filter, the particle filter apparatus further comprising a cold flame vaporizer in which fuel is partially oxidized in preheated air to form a cold flame gas, wherein 2-20% of the calorific value of the fuel is released, the cold flame vaporizer being arranged in fluid communication with the exhaust conduit such that the cold flame gas can flow through the particle filter, thereby removing deposits of soot which has accumulated in the particle filter.

2. Particle filter apparatus according to claim 1, wherein the particle filter apparatus is provided with one or more valve means which controls the flow of exhaust gas through the exhaust gas conduit.

3. Particle filter apparatus according to claim 1, wherein the particle filter apparatus is provided with valve means which controls the flow of cold flame gas from the cold flame vaporizer into the exhaust gas conduit and through the particle filter.

4. Particle filter apparatus according to claim 1, wherein the cold flame vaporizer is arranged outside the exhaust flow conduit and, connected to the exhaust gas conduit with fluid lines.

5. Particle filter apparatus according to claim 1, wherein the cold flame vaporizer is arranged inside the exhaust gas conduit.

6. Particle filter apparatus according to claim 1, wherein the particle filter apparatus comprises a fuel supply which is arranged in fluid communication with the cold flame vaporizer.

7. Particle filter apparatus according claim 1, wherein the particle filter apparatus comprises an air supply and a heat exchanger for preheating the air, the air supply being in fluid communication with the cold flame vaporizer.

8. Particle filter apparatus according to claim 6 or 7, wherein the particle filter apparatus comprises one or more valve means controlling the flow of fuel and preheated air to the cold flame vaporizer.

9. Particle filter apparatus according claim 1, wherein the particle filter apparatus comprises an air supply and an electrical heater for preheating the air, the air supply being in fluid communication with the cold flame vaporizer.

10. Particle filter apparatus according claim 1, wherein only a fraction of oxygen in the air is used in the partial oxidization forming the cold flame gas.

11. Particle filter apparatus according claim 1, wherein the temperature of the cold flame gas is about 450° C.

12. Engine exhaust system for an internal combustion engine, the engine exhaust system comprising an exhaust conduit connected to the engine, an exhaust gas return conduit such that at least a part of the exhaust gas can be returned to the engine, the exhaust gas return conduit, at least along a part of its length, being formed with at least two flow paths, the engine exhaust system further comprising a particle filter arranged in each of the at least two flow paths, the engine exhaust system further comprising at least one cold flame vaporizer in which fuel is partially oxidized in preheated air to form a cold flame gas, wherein 2-20% of the calorific value of the fuel is released, the at least one cold flame vaporizer being arranged in fluid communication with all the flow paths such that the cold flame gas can flow through the particle filters, whereby the cold flame gas can be used to regenerate the particle filter in at least one of the exhaust flow paths while, simultaneously, exhaust gas can flow through the other exhaust flow path or exhaust flow paths.

13. Engine exhaust system according to claim 12, wherein the flow paths are formed by providing the exhaust gas return conduit with one or more partitions, at least along a part of its length, such that two or more separate flow paths for the exhaust gas are formed in the exhaust conduit section.

14. Engine exhaust system according to claim 12, wherein the flow paths are formed by providing the exhaust gas return conduit with at least two separate conduits through which the exhaust gas can flow.

15. Engine exhaust system according to one of the claims 12-14, wherein the engine exhaust system is provided with one or more valve means which controls the flow of exhaust gas through the flow paths of the exhaust gas return conduit.

16. Engine exhaust system according to claim 12, wherein the engine exhaust system is provided with one or more valve means controlling the flow of cold flame gas from the at least one cold flame vaporizer to the exhaust gas return conduit and the particle filters in the flow paths.

17. Engine exhaust system according to claim 12, wherein the at least one cold flame vaporizer is arranged outside the flow paths of the exhaust gas return conduit and, if necessary, connected to the flow paths with fluid lines.

18. Engine exhaust system according to claim 12, wherein the at least one cold flame vaporizer is arranged inside the flow paths of the exhaust gas return conduit.

19. Engine exhaust system according to claim 12, wherein the engine exhaust system comprises a fuel supply which is arranged in fluid communication with the at least one cold flame vaporizer, and valve means controlling the flow of fuel to the at least one cold flame vaporizer.

20. Engine exhaust system according claim 12,
wherein the engine exhaust system comprises an air supply and means for preheating the air, the air supply being arranged in fluid communication with the at least one cold flame vaporizer, and valve means controlling the flow of preheated air to the at least one cold flame vaporizer.

21. Engine exhaust system according to claim 12,
wherein only a fraction of oxygen in the air is used in the partial oxidization forming the cold flame gas.

22. Engine exhaust system according to claim 12, the temperature of the cold flame gas is about 450° C.

23. Method for cleaning a particle filter with deposits of particulate matter and soot originating from an exhaust gas, the filter being arranged in an exhaust conduit, wherein the method comprises the steps of providing a cold flame gas, wherein 2-20% of the calorific value of the fuel is released, and letting the cold flame gas flow through the particle filter, whereby the soot is removed from the particle filter.

24. Method according to claim 23,
wherein the method comprises the step of providing one or more valve means for controlling the flow of cold flame gas from a cold flame vaporizer, in which the fuel is partially oxidized in preheated air to form the cold flame gas, into the exhaust conduit.

25. Method according the to claim 24,
wherein the method comprises the step of providing a fuel supply arranged in fluid communication with the cold flame vaporizer, and an air supply and a heat exchanger for the preheating of the air, the air supply being arranged in fluid communication with the cold flame vaporizer.

26. Method according to claim 25,
wherein the method comprises the step of providing one or more valve means for controlling the flow of fuel and preheated air to the cold flame vaporizer.

27. Method according to claim 24,
wherein the method comprises the step of providing a fuel supply arranged in fluid communication with the cold flame vaporizer, and an air supply and an electrical heater for the preheating of the air, the air supply being arranged in fluid communication with the cold flame vaporizer.

28. Method according to claim 23,
wherein only a fraction of oxygen in the air is used in the partial oxidization forming the cold flame gas.

29. Method according to claim 23,
wherein the temperature of the cold flame gas is about 450° C.

30. Method for cleaning a particle filter arranged in an exhaust gas return system of an internal combustion engine, the exhaust gas return system comprising an exhaust gas return conduit which, at least along a part of its length, is formed with at least two flow paths, the at least two flow paths each being provided with a particle filter for the removal of particulate matter and soot in the exhaust gas,
wherein the method comprises the steps of
providing a cold flame gas, wherein 2-20% of the calorific value of the fuel is released,
letting the cold flame gas flow through the particle filter in at least one of the flow paths of the exhaust gas return conduit, thereby regenerating the particle filter by removing deposited soot.

31. Method according to claim 30,
wherein the method comprises the step of providing one or more valve means for separately controlling the flow of cold flame gas from a cold flame vaporizer, in which fuel is partially oxidized in preheated air, into each flow path of the exhaust gas conduit.

32. Method according to claim 31,
wherein the method comprises the step of providing a fuel supply arranged in fluid communication with the cold flame vaporizer, and an air supply and heating means for the preheating of the air, the air supply being arranged in fluid communication with the cold flame vaporizer.

33. Method according to claim 32,
wherein the method comprises the step of providing one or more valve means for controlling the flow of fuel and preheated air to the cold flame vaporizer.

34. Method according to claim 30,
wherein the method comprises the step of arranging, in each flow path in the exhaust conduit section, the NOx trap downstream of the respective particle filter.

35. Method according to claim 30,
wherein the method comprises the step of arranging an oxidation catalyst in the exhaust conduit section downstream of the particle filter and the NOx trap.

36. Method for regeneration of a particle filter with deposits of soot
wherein a cold flame gas is flowed through the particle filter, wherein the cold fuel gas is provided by releasing 2-20% of the calorific value of a fuel.

* * * * *